(12) United States Patent
Nishikawa (10) Patent No.: US 8,773,723 B2
(45) Date of Patent: Jul. 8, 2014

(54) GENERATING COLOR SEPARATION TABLE FOR PRINTER HAVING COLOR FORMING MATERIALS WITH HIGH AND LOW RELATIVE DENSITIES USING A GAMUT BOUNDARY TO LIMIT USE OF DARK COLOR MATERIAL

(71) Applicant: Canon Kabushiki Kaisha, Tokyo (JP)

(72) Inventor: Hiromitsu Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 13/676,054

(22) Filed: Nov. 13, 2012

(65) Prior Publication Data

US 2013/0141764 A1    Jun. 6, 2013

(30) Foreign Application Priority Data

Dec. 1, 2011    (JP) ................. 2011-264119

(51) Int. Cl.
    *H04N 1/60*    (2006.01)
(52) U.S. Cl.
    USPC .......... 358/3.26; 358/515; 358/518; 358/521; 358/523
(58) Field of Classification Search
    None
    See application file for complete search history.

(56) References Cited

U.S. PATENT DOCUMENTS

| | | | |
|---|---|---|---|
| 5,508,827 A | 4/1996 | Po-Chieh | |
| 6,923,523 B2 | 8/2005 | Nishikawa et al. | |
| 6,995,881 B2 * | 2/2006 | Iida et al. | 358/529 |
| 7,009,734 B2 * | 3/2006 | Suwa et al. | 358/518 |
| 7,016,530 B2 | 3/2006 | Saito et al. | |
| 7,408,675 B2 * | 8/2008 | Ono | 358/1.9 |
| 7,697,177 B2 | 4/2010 | Nishikawa | |
| 7,843,599 B2 | 11/2010 | Nishikawa et al. | |
| 7,978,385 B2 | 7/2011 | Nishikawa | |
| 8,233,191 B2 * | 7/2012 | Tsuchiya | 358/515 |
| 8,270,048 B2 | 9/2012 | Nishikawa | |
| 8,643,665 B2 * | 2/2014 | Weihing et al. | 345/590 |
| 2007/0146753 A1 | 6/2007 | Nishikawa | |
| 2011/0242556 A1 | 10/2011 | Jinno et al. | |

FOREIGN PATENT DOCUMENTS

| | | |
|---|---|---|
| JP | 6-242523 | 9/1994 |
| JP | 2554366 | 11/1996 |
| JP | 4035278 | 1/2008 |
| JP | 4623029 | 2/2011 |

OTHER PUBLICATIONS

U.S. Appl. No. 13/812,492, filed Jan. 25, 2013 by Hiromitsu Nishikawa.

* cited by examiner

*Primary Examiner* — Scott A Rogers
(74) *Attorney, Agent, or Firm* — Fitzpatrick, Cella, Harper & Scinto (57) ABSTRACT

To generate a color separation table for an image forming apparatus which has relatively dark/light color materials with high/low relative densities, a gamut boundary for limiting the use of the relatively dark color material is set. One of relatively dark color materials is selected, and at least a grid point which satisfies a condition that the color material value of the selected relatively dark color material is nonzero and a color value to be reproduced based on color material values set to the grid point exists in a region brighter than the gamut boundary is determined. The color material value of the selected relatively dark color material set to the grid point which satisfies the condition is replaced by the color material value of the relatively light color material.

9 Claims, 11 Drawing Sheets

GENERATING COLOR SEPARATION TABLE FOR PRINTER HAVING COLOR FORMING MATERIALS WITH HIGH AND LOW RELATIVE DENSITIES USING A GAMUT BOUNDARY TO LIMIT USE OF DARK COLOR MATERIAL

BACKGROUND OF THE INVENTION

1. Field of the Invention

The present invention relates to color processing of generating a color separation table.

2. Description of the Related Art

A printer forms an image by converting RGB signal values or CMYK signal values into the color material signal values, each of which corresponds to each color material held by the printer, and applying, to a printing medium, each color material, an amount of which corresponds to the color material signal value. The conversion into color material signal values is called color separation. A lookup table (LUT) and an interpolation technique such as tetrahedron interpolation or cubic interpolation are generally used for the color separation.

A lookup table (to be referred to as a "color separation table" hereinafter) used for color separation stores color material signal values corresponding to input signal values as an LUT for an N-grid. Note that if an input signal value includes eight bits for each color, N is an integer which falls within the range from 2 to 255. Color reproduction by the printer is based on the color separation. As a method of generating a color separation table, various methods have been proposed.

For example, Japanese Patent No. 2554366 (literature 1) discloses a method of forming patch images for which the color material values of C, M, Y, and K have been quantized, and predicting reproduction colors for the respective color material values using the colorimetric values of the patch images. Furthermore, Japanese Patent Laid-Open No. 6-242523 (literature 2) discloses a method of performing color separation for a target color to obtain C, M, Y, and K based on the predicted reproduction colors for the respective color material values, which are obtained by the method of literature 1.

Those techniques in literatures 1 and 2 can improve the tonal continuity by combining a color represented by the input signal value and the colors reproduced based on the color material signal values but cannot control the graininess of a print image.

On the other hand, Japanese Patent No. 4623029 (literature 3) discloses an operation of controlling the graininess using representative tones in an RGB color solid. According to literature 3, the representative tones include a tone from a white point Pw to a black point Pk, and tones from the point of red (R), green (G), blue (B), cyan (C), magenta (M), or yellow (Y) to the black point Pk. For each tone, the ratio of under color removal (UCR ratio) of the tone values of achromatic colors each represented by a combination of chromatic color materials, which are replaced by a black color material, is set, and the UCR ratio of a point within a color gamut is interpolated by a method shown in FIG. 20 of literature 3, thereby setting the UCR ratio according to the hue and chroma.

In recent years, there are many printers having color materials with the same hue and different densities to improve the graininess. Representative examples are light color materials such as light cyan (LC) and light magenta (LM) each having a low density.

Japanese Patent No. 4035278 (literature 4) relates to generation of a color separation table using light cyan (LC) and light magenta (LM), and discloses an operation of controlling the graininess using representative tones in an RGB color solid. According to literature 4, the representative tones include a tone from a white point Pw to a black point Pk, and tones from the white point Pw to the black point Pk through the point of red (R), green (G), blue (B), cyan (C), magenta (M), or yellow (Y). For each tone, color material switching occurs. For example, in transition from Pw to C, switching from light cyan (LC) to cyan (C) occurs. A point (to be referred to as an "application start point" hereinafter) of starting to apply cyan (C) in the color material switching is set, and the application start point of cyan (C) within the color solid is calculated by a color material value interpolation technique based on color material values.

In the graininess control operation disclosed in literature 3 or 4, even if the graininess of the representative tones can be controlled with high accuracy, the color material value of a point within the color solid is determined by interpolation based on color material values, and is not always optimal. The graininess indicates a fluctuation in density on an image surface. In the light of color separation for reproducing color by area coverage modulation, if the local density of a single dot of a color material is relatively high with respect to the global density for an arbitrary area, granularity is observed. That is, it is not ensured that an interpolated color material value always has the same or higher density (or lower lightness).

As a result, a black color material which is controlled according to the hue/chroma by the technique of literature 3 may be used in a region where the density is lower (lightness is higher) than that used in the representative tones. Furthermore, in the technique of literature 4, a color material with a relatively high density may be used in a region where the lightness is higher than that used in the representative tones.

SUMMARY OF THE INVENTION

In one aspect, a color processing apparatus for generating a color separation table for an image forming apparatus which has a relatively dark color material with a high relative density and a relatively light color material with a low relative density, the color processing apparatus comprising: a setting section configured to set a gamut boundary for limiting use of the relatively dark color material; a determiner configured to select one of a plurality of relatively dark color materials, and determine, from a basic color separation table, at least a grid point which satisfies a condition that a color material value of the selected relatively dark color material is nonzero and a color value to be reproduced based on color material values set to the grid point exists in a region brighter than the gamut boundary; and a replacement section configured to replace, by a color material value of the relatively light color material, the color material value of the selected relatively dark color material set to the grid point which satisfies the condition.

According to the aspect, it is possible to generate a color separation table which enables improvement of the graininess and suppression of the granularity.

Further features of the present invention will become apparent from the following description of exemplary embodiments with reference to the attached drawings.

DESCRIPTION OF THE EMBODIMENTS

Color processing according to embodiments of the present invention will be described in detail below with reference to the accompanying drawings.

First Embodiment

Printing materials held in an image forming apparatus (printer) will be described as a cyan color material, magenta color material, yellow color material, black color material, light cyan color material, light magenta color material, gray color material (which is a light black color material), red color material, green color material, blue color material, and the like. A color, or its data or hue is indicated by C, M, Y, K, LC, LM, Gy, R, G, B, or the like. For example, C indicates cyan, or its color material data or hue. Similarly, M, Y, K, LC, LM, Gy, R, G, and B indicate magenta, yellow, black, light cyan, light magenta, gray, red, green, and blue, or their color material data or hue, respectively.

The smallest unit for defining on/off of dots is referred to as an "area". In relation to this, the following "image data" represents a set of pixel data to be processed, and each pixel data includes a tone value formed by, for example, eight bits for each color. Furthermore, "pixel data" in halftone processing represents pixel data itself to be processed. Halftone processing converts pixel data representing a tone value formed by a plurality of bits (for example, eight bits) into, for example, pixel data representing a tone value formed by one bit.

A printer having basic four color materials C, M, Y, and K, further having LC with the same hue as that of C and a density different from that of C, and LM with the same hue as that of M and a density different from that of M will be exemplified below. An application to R, G, and B which have been recently used to improve the color reproducible range of the printer will be described.

A case in which a color prediction technique of predicting the spectral reflectance and color reproducibility represented by XYZ and L*a*b* based on combinations of the color material values of C, M, Y, K, LC, and LM is used will be explained below. Various color prediction techniques have been studied. As disclosed by literature 1, for example, there is provided a method of actually forming patch images for which the color material values of C, M, Y, and K have been quantized, and predicting the color reproducibility for a plurality of color material values using the colorimetric values of the patch images. There are also provided various methods such as a Neugebauer model for predicting the color reproducibility based on the spectral reflectance and area ratio of a color material mixture, and a cell-division Yule-Nielsen spectral Neugebauer model obtained by extending the Neugebauer model. Assume in the following description that one of the color prediction techniques is used.

[Arrangement of Apparatus]

Figure 1:
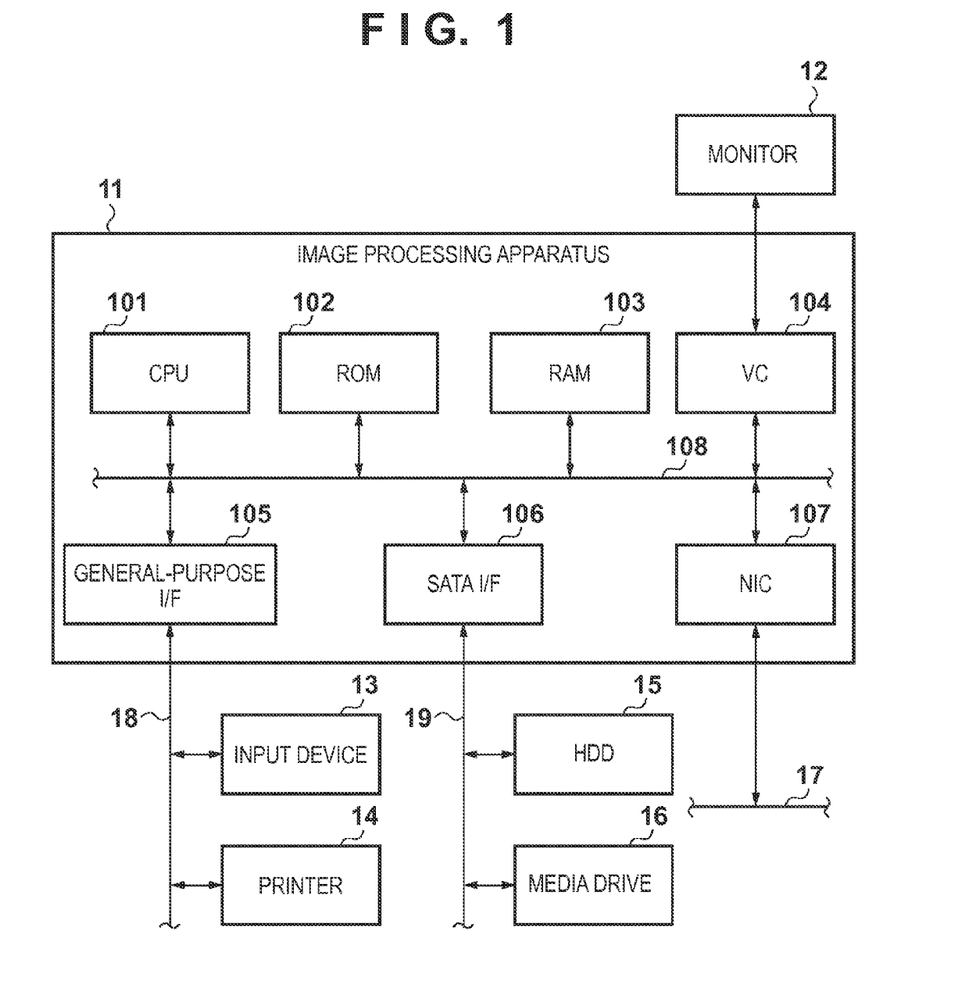
FIG. 1 is a block diagram for explaining the arrangement of an image processing apparatus according to an embodiment.

The arrangement of an image processing apparatus 11 according to the embodiment will be described with reference to a block diagram shown in FIG. 1.

A microprocessor (CPU) 101 uses a random access memory (RAM) 103 as a work memory to execute an operating system (OS) and various programs stored in a read only memory (ROM) 102, a hard disk drive (HDD) 15, and various recording media, thereby controlling each component via a system bus 108. Note that the programs executed by the CPU 101 include a program such as image processing (to be described later).

A general-purpose interface (I/F) 105 is, for example, a serial bus interface such as a USB (Universal serial bus) interface, which is connected with an input device 13 such as a mouse or keyboard, and a printer 14 via a serial bus 18. A serial ATA (SATA) I/F 106 is connected with the HDD 15 and a media drive 16 for writing/reading data in/from various recording media. The CPU 101 uses, as a data storage location, the HDD 15 and each of the various recording media mounted on the media drive 16.

A network interface card (NIC) 107 serves as a network interface, which is connected with a network 17 such as a local area network (LAN). A video card (VC) 104 serves as a video interface, which is connected with a monitor 12. The CPU 101 displays, on the monitor 12, a user interface (UI) provided by a program, and receives a user input including a user instruction through the input device 13.

[Functional Arrangement]

The functional arrangement of the image processing apparatus 11 and the printer 14 will be described with reference to a block diagram shown in FIG. 2.

Image Processing Apparatus

Figure 2:
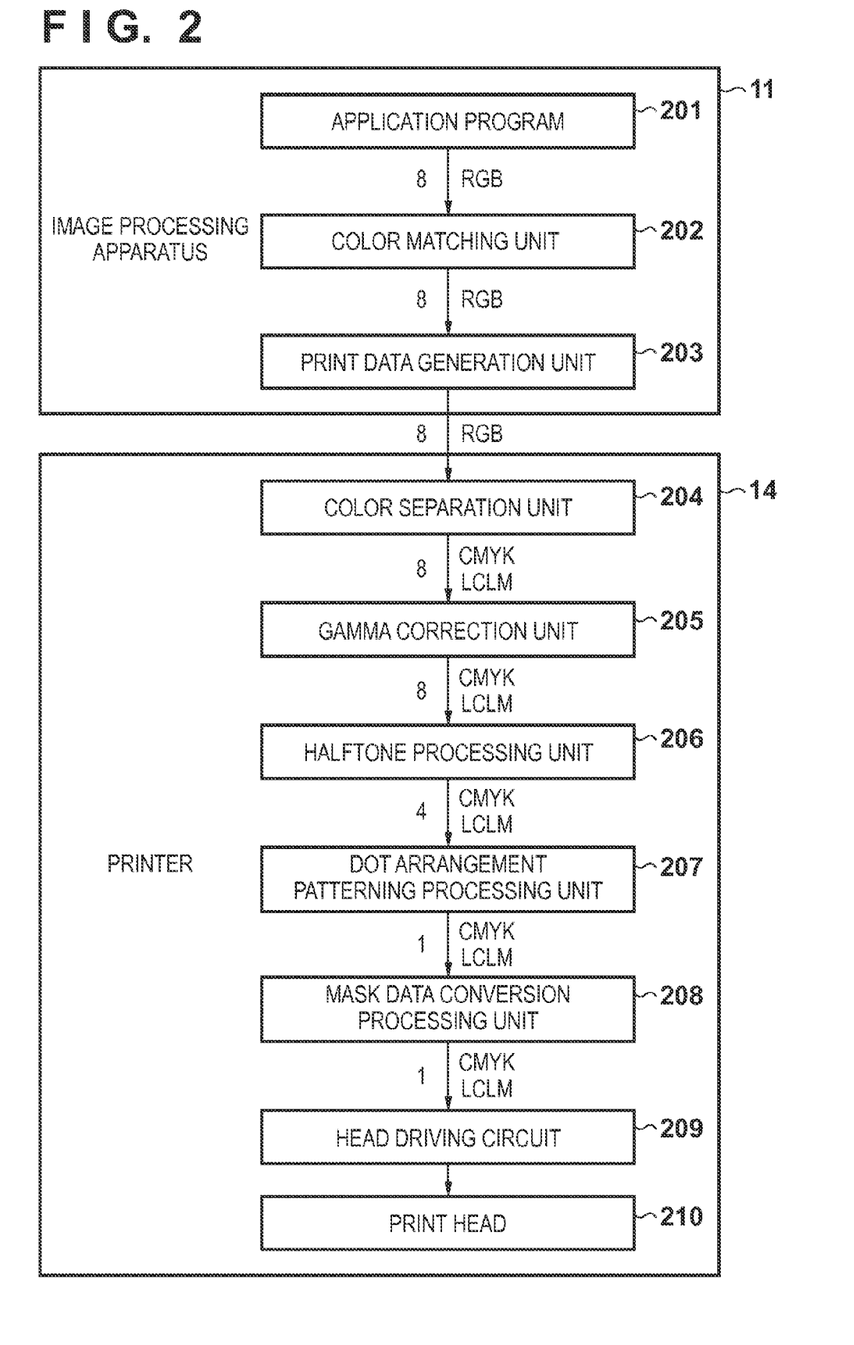
FIG. 2 is a block diagram for explaining the functional arrangement of the image processing apparatus and a printer.

The functional arrangement of the image processing apparatus 11 shown in FIG. 2 is implemented when the CPU 101 executes an image processing application program (AP) and a printer driver.

In the image processing apparatus 11, an AP 201 generates image data to be printed by the printer 14. Alternatively, the AP 201 inputs image data from the HDD 15 or recording medium, a server on the network 17, or a device (digital camera or card reader) connected with the serial bus 18. The AP 201 then displays an image represented by the input image data on the monitor 12, and edits and processes the image data according to a user input to create image data to be printed. Note that the image data at this time is, for example, RGB data complying with the sRGB standard.

A color matching unit 202 holds, for example, a three-dimensional LUT (3DLUT) for mapping the color gamut of the RGB data complying with the sRGB standard into that of the printer 14. A combination of the 3DLUT and an interpolation operation converts RGB data including eight bits for each color into RGB data within the color gamut of the printer 14. Note that the color matching unit 202 may perform the above conversion processing using a determinant instead of the 3DLUT. A print data generation unit 203 converts the RGB data input from the color matching unit 202 into print data suitable for the printer 14 by performing, for example, resolution conversion and format conversion. Alternatively, the unit 203 converts the RGB data into data (print data) described in a description language (for example, PDL) for the printer.

Printer

Assume in the following description that the printer 14 is an inkjet printer. The printer 14, however, is not limited to this, and may be an electrophotographic printer, or thermal transfer/dye-sublimation thermal transfer printer.

Each of units 204 to 209 of the printer 14 shown in FIG. 2 is implemented as a dedicated hardware component, and operates under the control of a CPU (not shown) constituting the control unit of the printer 14. Note that each of the units 204 to 208 can be implemented in a printer driver operating on the image processing apparatus 11.

Print data is input to a color separation unit 204 from the image processing apparatus 11. The color separation unit 204 then performs, for each pixel, color separation processing for RGB data to convert color material data indicating the amounts of respective color materials for reproducing color represented by the RGB data. In the embodiment, the color separation processing is executed by a combination of the 3DLUT (color separation table) and an interpolation operation. Note that a method of generating a color separation table for improving the graininess will be described later.

A gamma correction unit 205 performs, for each color, tone value conversion for the color material data output from the color separation unit 204. More specifically, the gamma correction unit 205 uses a one-dimensional LUT according to the tone characteristics of each color material of the printer 14 to perform conversion for obtaining a linear relationship between the color material data and the tone characteristics of the printer 14.

For example, A halftone processing unit 206 quantizes 8-bit color material data C, M, Y, K, LC, or LM to, for example, 4-bit data using an error diffusion method. In, for example, a raster scanning order, the halftone processing unit 206 sequentially receives pixel data, quantizes the received pixel data, and outputs the quantization values of pixels.

General error diffusion processing will be briefly explained. Note that the smallest unit to undergo image processing of processing multi-valued data represented by a plurality of bits will be referred to as a "pixel", and data corresponding to a pixel will be referred to as pixel data. Note also that the image processing for multi-valued data represented by a plurality of bits indicates, for example, processing of converting RGB data including eight bits for each color into CMYKLCLM data including eight bits for each color, which corresponds to the color materials of the printer. The image processing for multi-valued data also includes halftone processing of quantizing CMYKLCLM data including eight bits for each color to CMYKLCLM data including four bits for each color. Furthermore, seen from a different point of view, "pixel" indicates the smallest unit which can represent a tone, and has tone value information with a plurality of bits.

Figure 3:
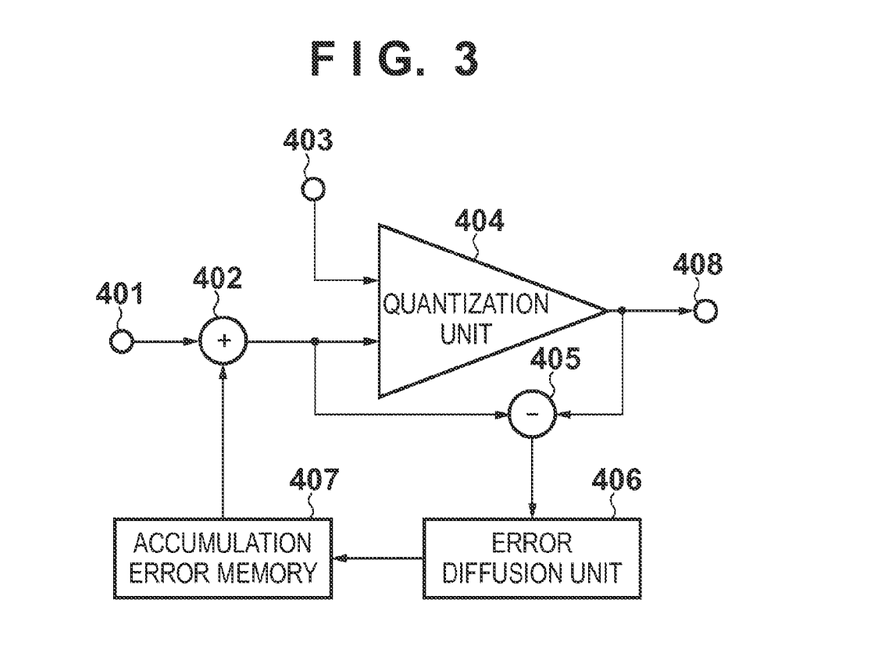
FIG. 3 is a block diagram for explaining the arrangement of a halftone processing unit.

The arrangement of the halftone processing unit 206 will be described with reference to a block diagram shown in FIG. 3. Pixel data is input to an input terminal 401. An adder 402 adds the input pixel data and error data in an accumulation error memory 407. A threshold (quantization threshold) in quantizing the pixel data to two or more tone values is set in a threshold terminal 403. A quantization unit 404 outputs, to an output terminal 408, a quantization value obtained by quantizing the sum of the input pixel data and error data.

An error computation unit 405 calculates the difference (quantization error) between the input value (sum) and the output value (quantization value) of the quantization unit 404. An error diffusion unit 406 diffuses the quantization error into the surrounding pixels of a pixel (a pixel of interest) to be quantized. The accumulation error memory 407 stores an accumulation error obtained by accumulating the diffused errors.

A dot arrangement patterning processing unit 207 determines, for each pixel of an actual print image, the arrangement of dots according to a dot arrangement pattern corresponding to 4-bit index data (tone value information) as print data. By assigning, to each pixel represented by 4-bit data, a dot arrangement pattern corresponding to the tone value of the pixel, on/off of dots is defined for each of a plurality of areas within the pixel, and discharge data "1" or "0" is arranged for each area within the pixel.

A mask data conversion processing unit 208 executes mask processing for the 1-bit discharge data output from the dot arrangement patterning processing unit 207. That is, processing of recording a scan region with a predetermined width by a print head 210 is executed a plurality of times, thereby generating discharge data for each scan operation for completing scanning for a plurality of lines by executing mask processing for each scan operation.

Discharge data CMYKLCLM for each scan operation is sent to a head driving circuit 209 at an appropriate timing. The head driving circuit 209 discharges color materials by driving the print head 210 based on the discharge data CMYKLCLM.

[Generation of Color Separation Table]

In the embodiment, the method disclosed in literature 4 or the like is used to generate a basic color separation table (to be simply referred to as a "basic table" hereinafter) by setting the color material values of each grid point of the representative tones, and interpolating the color material values of each grid point of the representative tones to set the color material values of each grid point within a color separation table. Furthermore, an operation of improving the graininess of the color separation table is performed using the basic table. An operation of controlling color material values for each hue, which improves the graininess, will be described below.

Control of Color Material Values

Figure 4A:
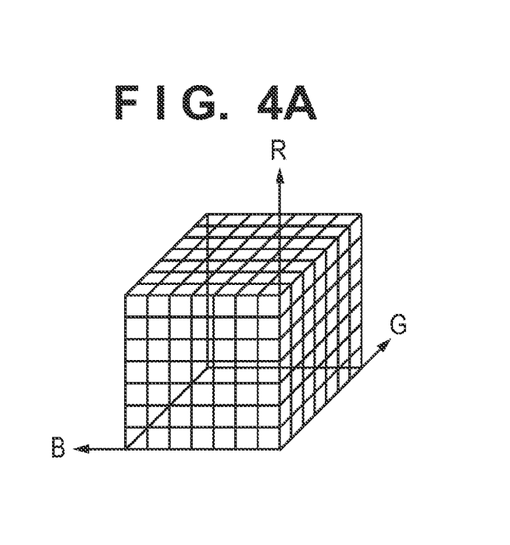
FIGS. 4A and 4B are views for explaining a color separation table.

A color separation table will be described with reference to FIGS. 4A and 4B. FIG. 4A shows a color separation table having R, G, and B axes. Each of the R, G, and B axes has eight grid points for each of 256 tone values, and thus output values (color material values) have been set for $8^3=512$ grid points (RGB input values). Note that as described above, the color separation table often has the number of grid points which is equal to the third power of the number of grid points of an N-grid (for eight bits, N is an integer which falls within the range from 2 (inclusive) to 256 (exclusive)). That is, FIG. 4A shows a case in which N=8.

Figure 4B:
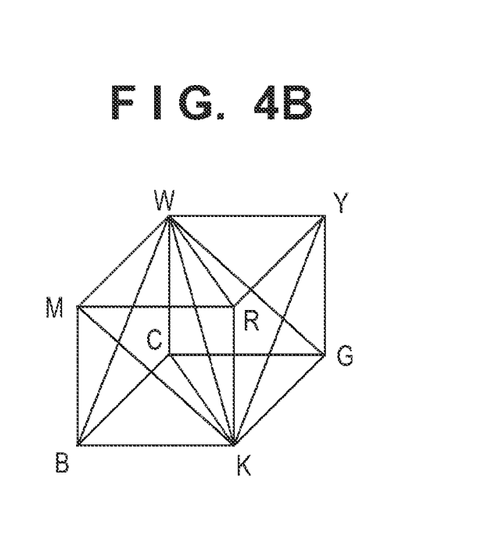

FIG. 4B shows a method of dividing, for each hue, the color separation table shown in FIG. 4A. FIG. 4B shows a line segment connecting a white point W with a black point K, a line segment connecting the white point W with each vertex of colors C, M, Y, R, G, and B, and a line segment connecting the black point K with each of the colors C, M, Y, R, G, and B. Each of the white point W, the black point K, and the grid points of the colors C, M, Y, R, G, and B will be referred to as a "vertex grid point" hereinafter.

Figure 5A:
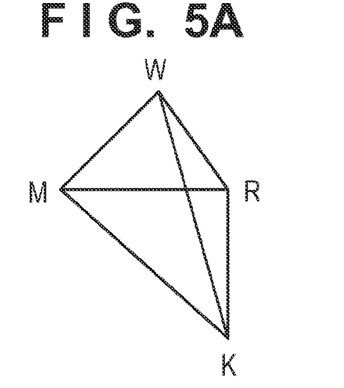
FIGS. 5A to 5F are views for explaining a tetrahedron obtained by dividing the color separation table.
Figure 5B:
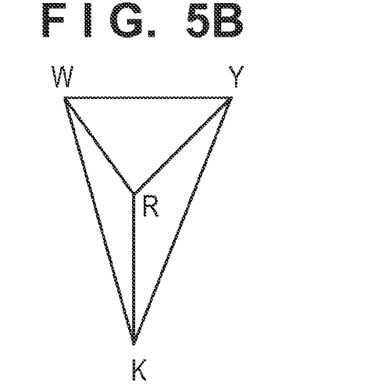
Figure 5C:
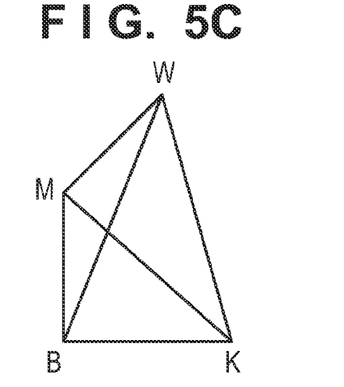
Figure 5D:
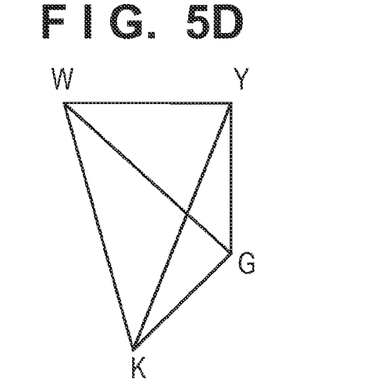
Figure 5E:
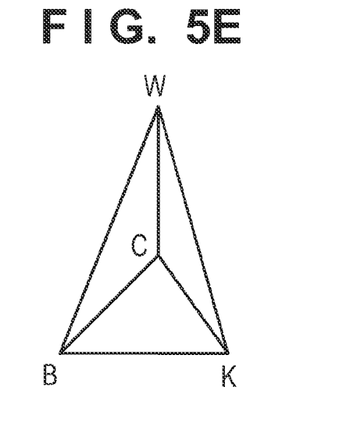
Figure 5F:
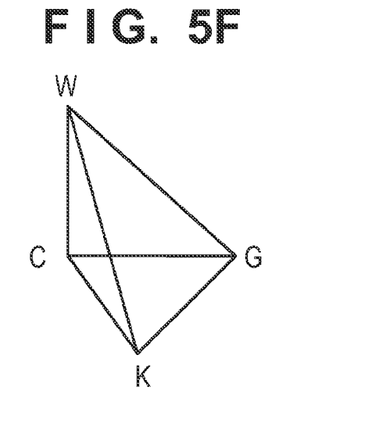

A tetrahedron obtained by dividing the color separation table will be described with reference to FIGS. 5A to 5F. FIGS. 5A to 5F show six tetrahedrons each obtained by dividing the color separation table by a line segment connecting vertex grid points of the color separation table in FIG. 4B. FIG. 5A shows a tetrahedron WMRK, FIG. 5B shows a tetrahedron WYRK, . . . , and FIG. 5F shows a tetrahedron WCGK. That is, six tetrahedrons each including vertex grid points adjacent to each other in a color hue with respect to a line segment WK as a center are obtained. Color material values are set to each line segment of each of the thus obtained tetrahedrons. For each tetrahedron, the color material value of a grid point within the tetrahedron is interpolated to generate a color separation table.

Since, however, the brightness of the application start point of a color material with a high relative density among the color material values set to each line segment is not preserved within the tetrahedron by interpolating a color material value, the graininess of the color of a grid point within the tetrahedron degrades as compared with the color of a grid point on each line segment. In this embodiment, the following method is used to control the graininess of the color of a grid point positioned within the tetrahedron, similarly to the graininess of the color of a grid point on each line segment.

Generation of Boundary Plane

Among operations associated with improvement of the graininess of the basic table, a method of starting from the application start point of a color material (to be referred to as a "relatively dark color material" hereinafter) with a high relative density on a line segment of a tetrahedron to generate, for each hue, in the L*a*b* space, a boundary plane indicating a gamut boundary for limiting the use of the relatively dark color material will be described.

Figure 6:
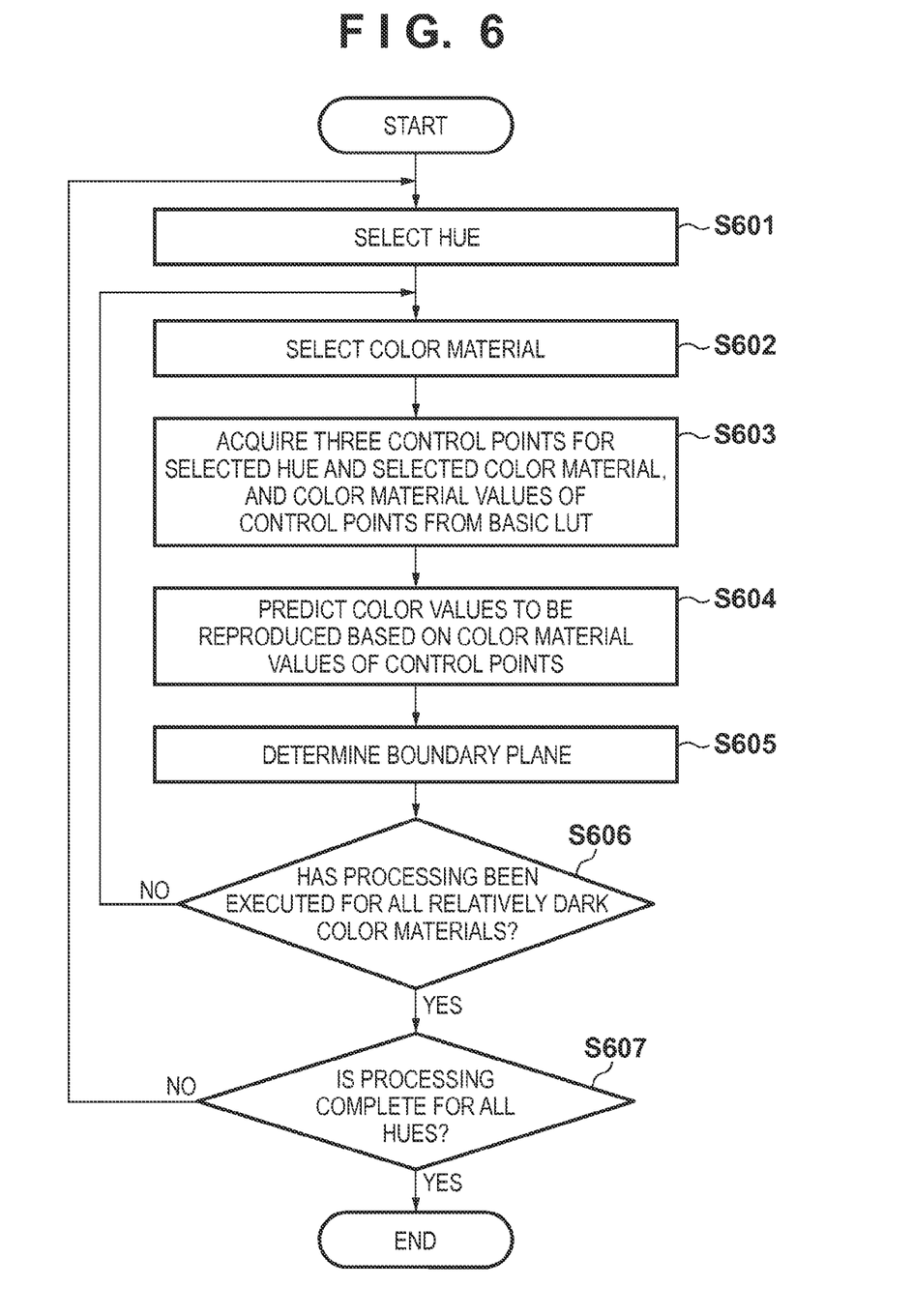
FIG. 6 is a flowchart for explaining processing of generating a boundary plane.

Processing of generating a boundary plane will be explained with reference to a flowchart shown in FIG. 6. Note that the CPU 101 executes this processing.

The CPU 101 selects a hue (step S601). Selection of a hue corresponds to selection of one of the six tetrahedrons shown in FIGS. 5A to 5F. Note that processing when the tetrahedron shown in FIG. 5A is selected will be described below. The processing of FIG. 6, however, is repeatedly executed until all the six tetrahedrons are selected.

The CPU 101 selects a color material (step S602). A color material (to be referred to as a "selected color material" hereinafter) selected at this time is a relatively dark color material which may degrade the graininess when used in a relatively bright region (high brightness region). For example, the relatively dark color material is C for LC, M for LM, or K for C, M, or Y. A color material (to be referred to as a "relatively light color material" hereinafter) with a low relative density is LC for C, LM for M, or C, M, or Y for K.

The CPU 101 acquires the color material values of the gradation of each line segment of the selected tetrahedron from the basic table, and acquires a grid point (control point) corresponding to the application start point of the selected color material, and the color material value of the application start point.

The tetrahedron shown in FIG. 5A has six line segments WK, WM, WR, MK, RK, and MR. Processing is executed for, especially, the five segments WK, WM, WR, MK, and RK on which there is gradation in brightness. Note that although the processing of acquiring a control point is actually executed in a three-dimensional space, processes in one-, two-, and three-dimensional spaces will be sequentially explained in the order named for descriptive convenience.

Acquisition of Control Points in One-Dimensional Space

Figure 7:
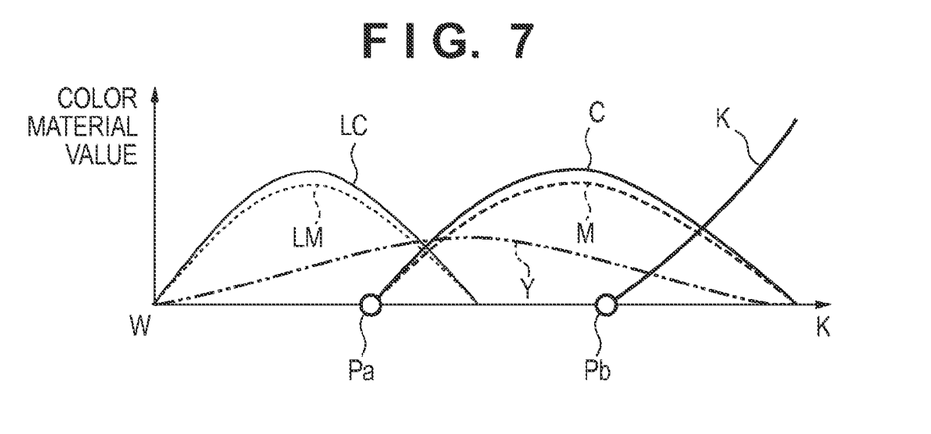
FIG. 7 is a view showing an example of the color material values of the gradation of a line segment WK of the tetrahedron shown in FIG. 5A.

FIG. 7 shows an example of the color material values of the gradation of the line segment WK of the tetrahedron shown in FIG. 5A. Color material values such that the relatively light color materials LC, LM, and Y are used in a high brightness region (highlight portion) close to the white point W, the color materials C and M are added in a middle brightness region, and the color material K is added in a low brightness region (shadow portion) are designated for the line segment WK. Note that Pa represents the application start points of C and M in the middle brightness region, and Pb represents the application start point of K in the shadow region.

If the selected color material is C or M, acquisition of a control point in the one-dimensional space indicates acquisition of the coordinate value of the point Pa and color material values at the coordinates. Similarly, if the selected color material is K, acquisition of a control point in the one-dimensional space indicates acquisition of the coordinate value of the point Pb and color material values at the coordinates.

Acquisition of Control Points in Two-Dimensional Space

Figure 8A:
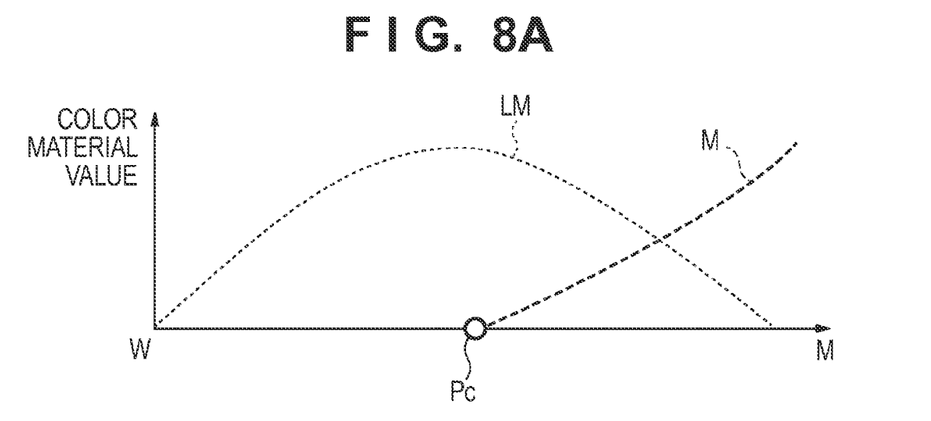
FIGS. 8A and 8B are views showing examples of the color material values of the gradation of each of line segments WM and ML of the tetrahedron shown in FIG. 5A.
Figure 8B:
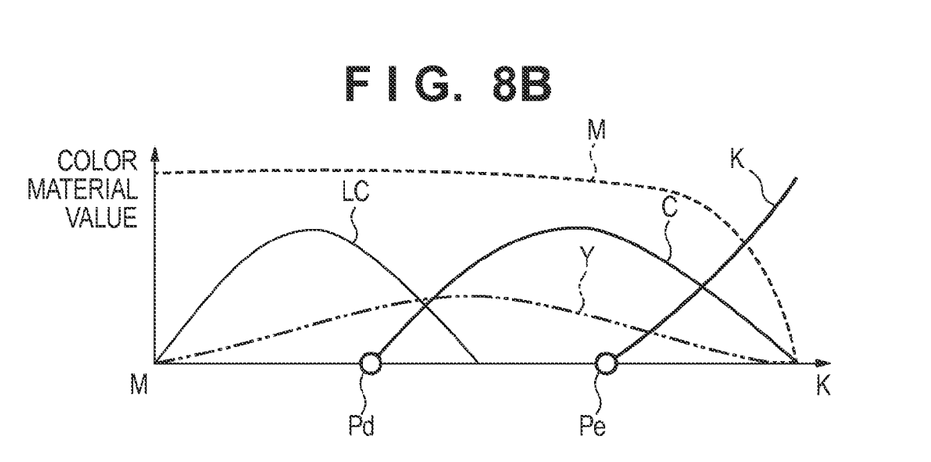

FIGS. 8A and 8B show examples of the color material values of the gradation of each of the line segments WM and ML of the tetrahedron shown in FIG. 5A. As shown in FIG. 8A, Pc represents the application start point of M on the line segment WM. As shown in FIG. 8B, Pd represents the application start point of C on the line segment MK and Pe represents the application start point of K on the line segment MK.

Figure 9:
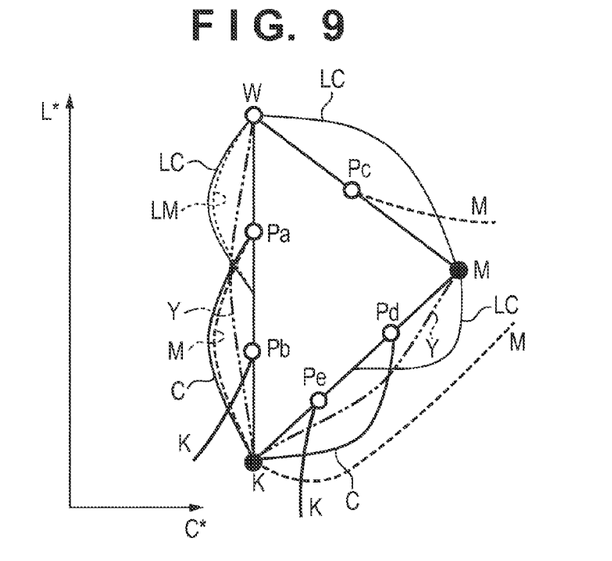
FIG. 9 is a view showing an example of the color material values of a plane WMK.

The line segments WK, WM, and MK described above form one plane WMK of the tetrahedron shown in FIG. 5A. FIG. 9 shows an example of the color material values of the plane WMK. That is, FIG. 9 is a view obtained by plotting the color material values and the application start points shown in FIGS. 7, 8A, and 8B on an L*C* plane.

If, for example, the selected color material is M, the points Pa and Pc each serving as the application start point of M are selected as control points. A line segment connecting the control points Pa and Pc is set as a boundary, and the color gamut is divided into bright and dark regions with respect to the boundary.

Figures 10A, 10B, 10C:
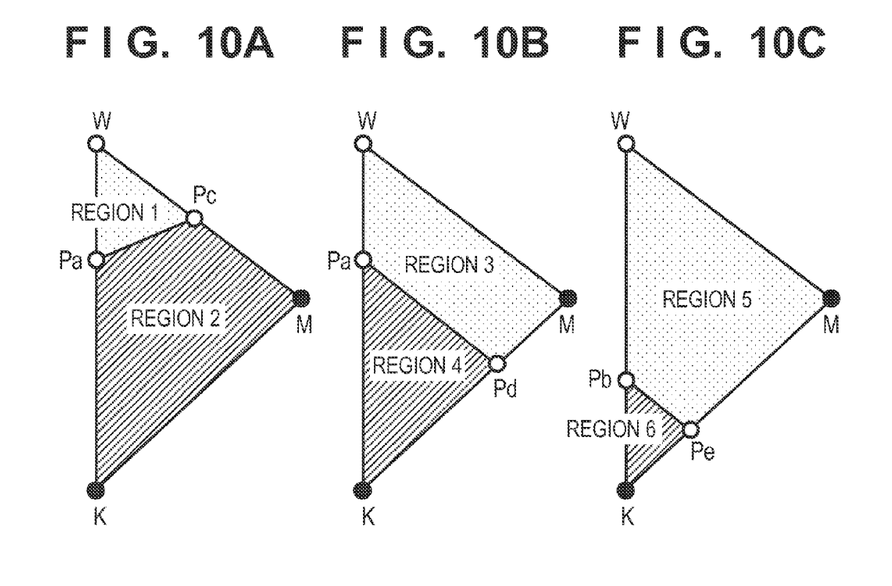
FIGS. 10A to 10C are views for explaining examples of a division of a color gamut.

Examples of division of the color gamut will be described with reference to FIGS. 10A to 10C. FIG. 10A shows a state in which the plane WMK has been divided into bright region 1 and dark region 2 by the boundary PaPc. In the example shown in FIG. 10A, the color material M is controlled not to be used for grid points existing in region 1, which is brighter than the boundary, and to be used for grid points existing in region 2, which is darker than the boundary.

As shown in FIG. 10B, the color material C is controlled not to be used for grid points existing in region 3, which is brighter than a boundary PaPd, and to be used for grid points existing in region 4, which is darker than the boundary PaPd. As shown in FIG. 10C, the color material K is controlled not to be used for grid points existing in region 5, which is brighter than a boundary PbPe, and to be used for grid points existing in region 6, which is darker than the boundary PbPe.

As described above, a set of two control points is acquired in the two-dimensional space.

Acquisition of Control Points in Three-Dimensional Space

Acquisition of control points in a case that the remaining line segments WR and RK forming the tetrahedron, on each of which there is gradation in brightness, are considered, will now be described.

Figure 11A:
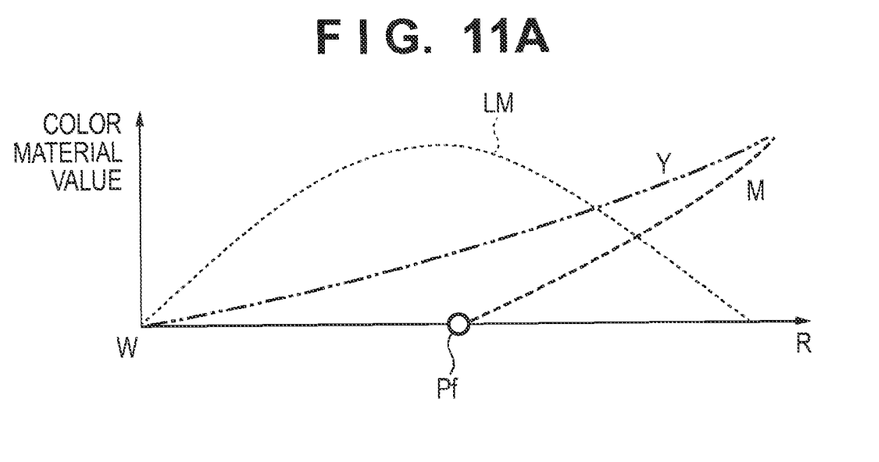
FIGS. 11A and 11B are views showing examples of the color material values of the gradation of each of line segments WR and RK of the tetrahedron shown in FIG. 5A.
Figure 11B:
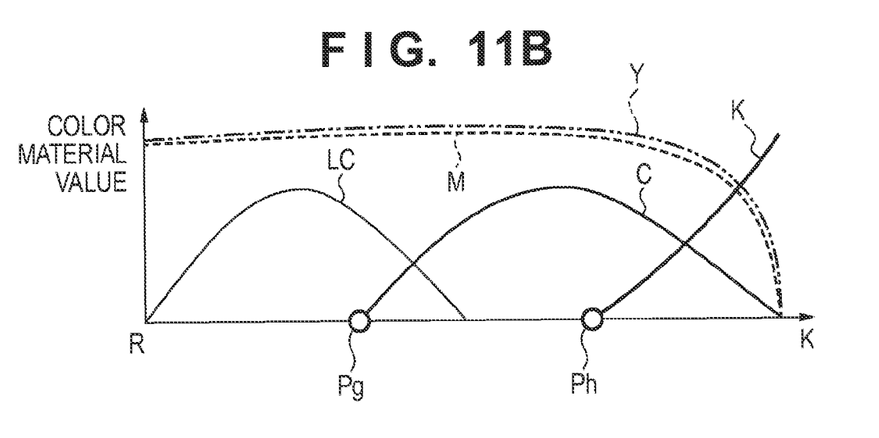

FIGS. 11A and 11B show examples of the color material values of the gradation of each of the line segments WR and RK of the tetrahedron shown in FIG. 5A. As shown in FIG. 11A, Pf represents the application start point of M on the line segment WR. As shown in FIG. 11B, Pg represents the application start point of C on the line segment RK, and Ph represents the application start point of K on the line segment RK.

Figure 12A:
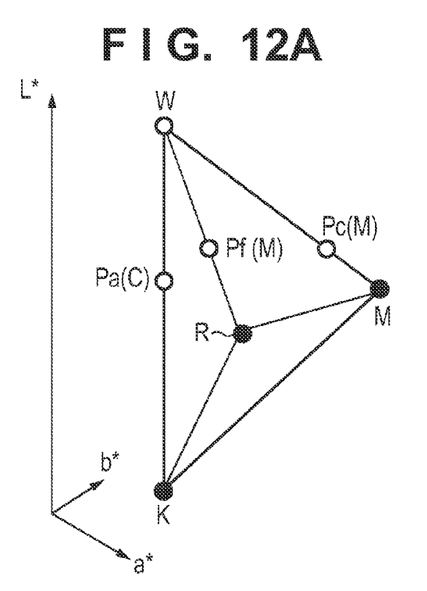
FIGS. 12A and 12B are views each showing an example of the color material values of a tetrahedron WMRK.
Figure 12B:
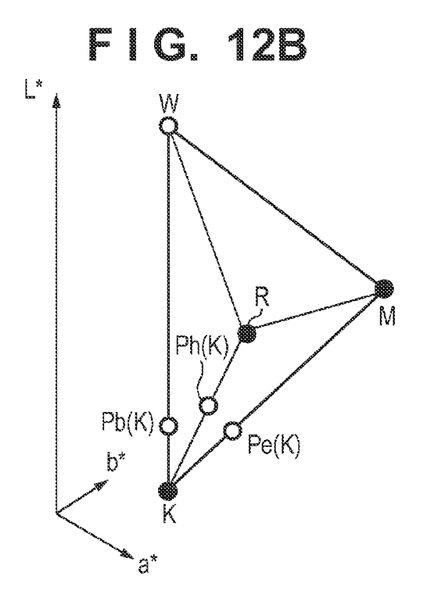

The line segments WK, WM, MK, WR, and RK described above form the tetrahedron WMRK shown in FIG. 5A. FIGS. 12A and 12B show examples of the color material values of the tetrahedron WMRK. That is, FIGS. 12A and 12B are views obtained by plotting the application start points shown in FIGS. 7, 8A, 8B, 11A, and 11B in the L*a*b* space.

FIG. 12A schematically shows control points in the L*a*b* space when the selected color material is M. Although FIG. 12A shows the control points Pa, Pc, and Pf on the line segments WK, WM, and WR, respectively, a set of three control points is acquired for one color material of one hue. FIG. 12B schematically shows control points in the L*a*b* space when the selected color material is K. Although not shown, a set of three control points are also acquired when the selected color material is C.

As described above, the CPU 101 acquires the hue selected in step S601, the coordinates (control points) of three application start points for the selected color material, and the color material values of the control points (step S603). The CPU 101 then uses one of the above-described color prediction techniques to obtain color values (for example, L*a*b* values) to be reproduced based on the color material values of each of the three control points (step S604).

Next, the CPU 101 solves simultaneous equations using the L*a*b* values of the three control points to calculate the coefficients of a plane equation in the three-dimensional space, thereby determining a boundary plane (step S605). This is a generally known geometric problem. The fact that three discrete points which do not exist on the same straight line determine one plane is used. That is, it is only necessary to obtain coefficients a, b, c, and d of the following equation representing a plane using the above-described simultaneous equations.

$$a(L^*)+b(a^*)+c(b^*)+d=0 \quad (1)$$

Figure 13:
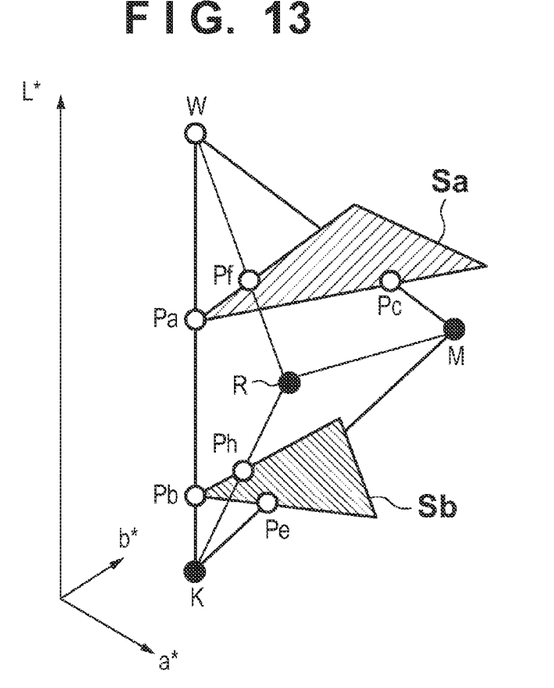
FIG. 13 is a view showing an example of a calculated boundary plane.

FIG. 13 shows an example of a calculated boundary plane. The color material M is controlled not to be used for grid points existing in a region which is brighter than a boundary plane Sa shown in FIG. 13, and to be used for grid points existing in a region which is darker than the boundary plane Sa. Similarly, the color material K is controlled not to be used for grid points existing in a region which is brighter than a boundary plane Sb, and to be used for grid points existing in a region which is darker than the boundary plane Sb. Although not shown, the same control operation is also executed when the selected color material is C.

With this processing, it is possible to control the color material values of the relatively dark color materials for each grid point.

After that, the CPU 101 determines whether the processing in steps S603 to S605 has been executed for all the relatively dark color materials (step S606). If an unprocessed color material exists, the process returns to step S602. If no unprocessed color material exists, the CPU 101 determines whether the processing is complete for all the tetrahedrons (six hues) shown in FIGS. 5A to 5F (step S607). If an unprocessed hue exists, the process returns to step S601.

Modification

Although the combination CMYKLCLM of color materials is assumed in the above description, the present invention is not limited to this. That is, although it is assumed in the above description that relatively light color materials are C, M, and Y for K, a relatively light color material may be Gy for K. In this case, the same processing as that for a color material with the same hue and a different density, such as LC for C need only be executed, and a detailed description thereof will be omitted. Recent printers may use color materials such as R, G, and B to extend the color reproducible range. In this case, the embodiment is also applicable.

Figure 14:
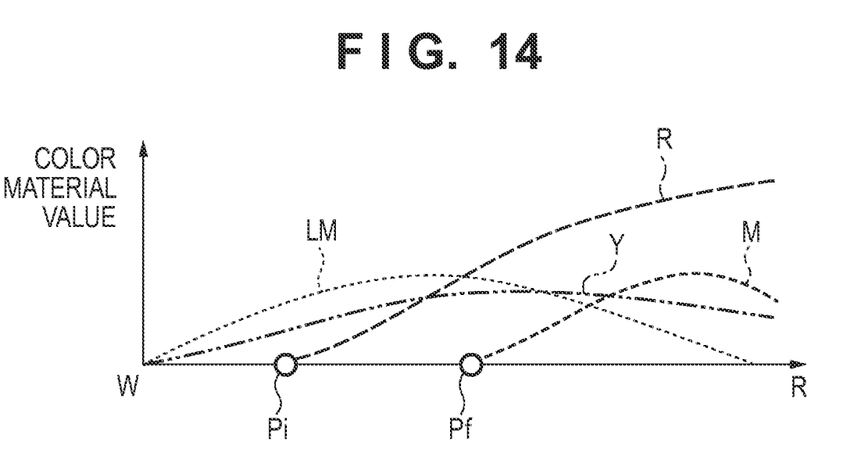
FIG. 14 is a view showing an example of the color material values of the gradation of the line segment WR when a color material R is used.

FIG. 14 shows an example of the color material values of the gradation of the line segment WR when the color material R is used. In this example, the density of the color material R may be higher than that of red generated by a color mixture of LM and Y, and thus the graininess may stand out. In this case, it is only necessary to enable to select R in step S602, and to add an application start point Pi shown in FIG. 14 as a control point.

Figure 15:
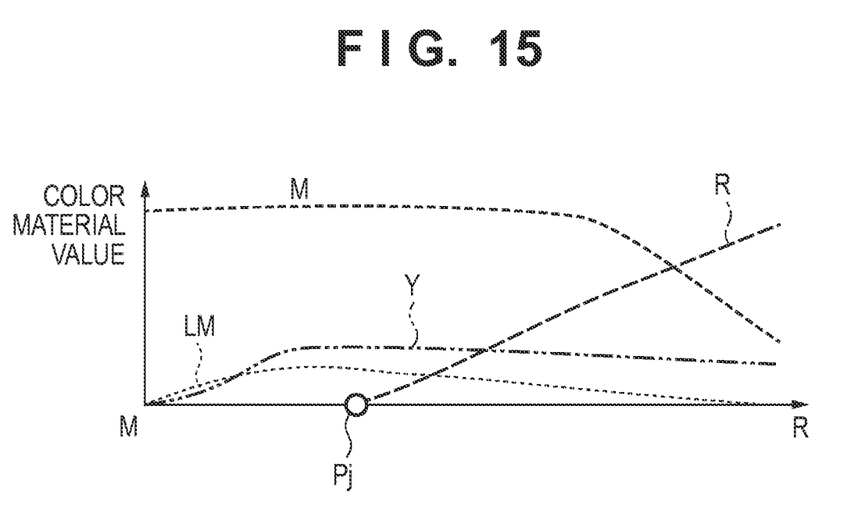
FIG. 15 is a view showing an example of the color material values of the gradation of a line segment MR of the tetrahedron shown in FIG. 5A.

Although not shown, when control points are determined for each line segment, the end grid point of the gradation is set as a control point if there is no application start point for a selected color material. If, for example, the application start point of R does not exist in the gradation of the line segment WK, a point K is selected as a control point. If the application start point of R does not exist in the gradation of the plane WMK, it is only necessary to select, as a control point, an application start point Pj of R existing in the gradation of the line segment MR shown in FIG. 15.

[Color Material Replacement Processing]

Among operations associated with improvement of the graininess of the basic table, a method of replacing the color material value of a relatively dark color material by that of a relatively light color material so as to reproduce almost the same color at a grid point which exists in a region brighter than a boundary plane, and at which the color material value of the relatively dark color material is nonzero will be described below.

Figure 16:
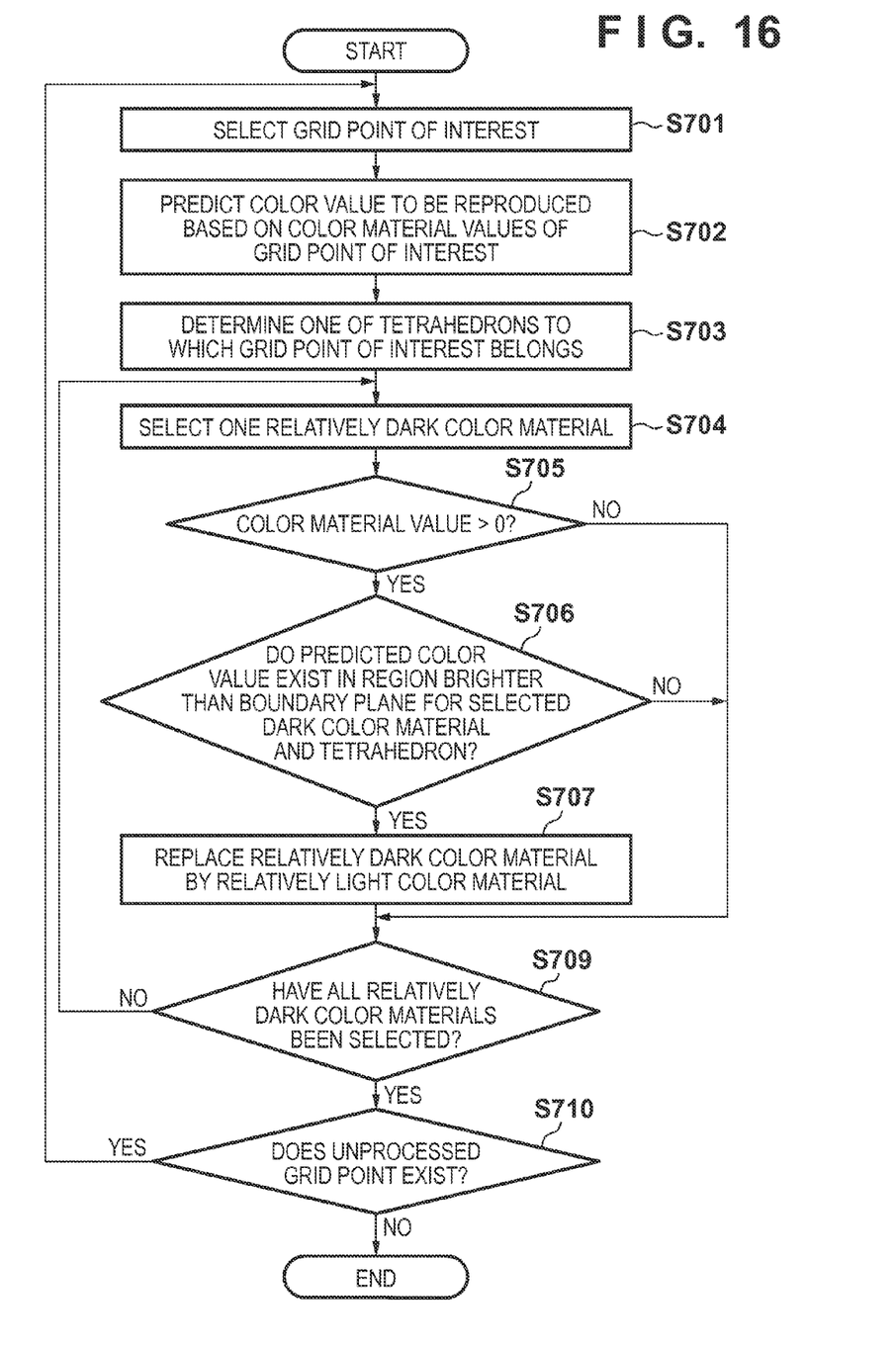
FIG. 16 is a flowchart for explaining color material replacement processing.

Color material replacement processing will be explained with reference to a flowchart shown in FIG. 16. Note that the CPU 101 executes this processing.

The CPU 101 selects a grid point (to be referred to as a grid point of interest) to be processed (step S701). The CPU 101 uses the same color prediction technique as that in step S604 to calculate a color value (for example, L*a*b* values, to be referred to as a "predicted color value" hereinafter) to be reproduced based on the color material values of the grid point of interest (step S702).

Based on the coordinate value (RGB value) of the grid point of interest, the CPU 101 determines one of the tetrahedrons (FIGS. 5A to 5F) corresponding to six hues, to which the grid point of interest belongs (step S703). The CPU 101 selects one relatively dark color material (step S704), and determines whether the color material value of the selected relatively dark color material (to be referred to as a "selected dark color material" hereinafter) at the grid point of interest is nonzero (>0) (step S705). If the color material value of the selected dark color material is zero, color material replacement processing is not necessary, and thus the process advances to step S709.

If the color material value of the selected dark color material is nonzero, the CPU 101 determines whether the predicted color value exist in a region brighter than a boundary plane for the selected dark color material and the tetrahedron to which the grid point of interest belongs (step S706).

Let $(L_r, a_r, b_r)$ be the predicted color value. Furthermore, let $a_{Sa}, b_{Sa}, c_{Sa}$, and $d_{Sa}$ be coefficients for the boundary plane (for example, the boundary plane Sa shown in FIG. 13), which has been calculated in step S605, for the selected dark color material and the tetrahedron to which the grid point of interest belongs. It is then possible to obtain a brightness value $L_{Sa}$ at a chromaticity point $(a_r, b_r)$ on the boundary plane Sa by solving equation (2) obtained by substituting chromaticities $a_r$ and $b_r$ of the color values and the coefficients into equation (1).

$$a_{Sa}(L_{Sa})+b_{Sa}(a_r)+c_{Sa}(b_r)+d_{Sa}=0 \qquad (2)$$

That is, the CPU 101 compares the brightness value $L_{Sa}$ with $L_r$ (step S706). If $L_{Sa} < L_r$, the CPU 101 determines that the selected dark color material is used in the region brighter than the boundary plane. The CPU 101 then executes color material replacement processing for a grid point for which the color material value of the relatively dark color material is nonzero and the predicted color value is in the region brighter than the boundary plane (step S707). If $L_{Sa} \geq L_r$, color material replacement processing is not necessary, and thus the process advances to step S709.

The color material replacement processing (step S707) predicts a color value to be reproduced, using the same color prediction technique as that in step S604 by setting the color material value of the selected dark color material (for example, M) to zero, and gradually increasing the color material value of a relatively light color material (for example, LM) with the same hue. It is only necessary to obtain the color material value of the relatively light color material such that the difference (color difference) between the color value before replacement and that after replacement is equal to or smaller than a predetermined threshold. Note that if the color difference cannot be smaller, a plurality of relatively light color materials such as other color materials (for example, LC and Y) are used to execute replacement processing.

The CPU 101 determines whether all the relatively dark color materials have been selected (step S709). If an unselected relatively dark color material exists, the process returns to step S704 to select one unselected relatively dark color material. If there is no unselected relatively dark color material, the CPU 101 determines whether the above processing has been executed for all the grid points (step S710). If an unprocessed grid point exists, the process returns to step S701; otherwise, the color material replacement processing ends.

As described above, the color material value of a relatively dark color material for which a color material value set to a grid point existing in a region brighter than a boundary plane is nonzero is replaced by the color material value of a relatively light color material. The color separation table for which the color material replacement processing is complete is set in the color separation unit 204. This can improve the graininess by performing color separation processing using the color separation table for which not only the application start points of dark color materials on each line segment of a tetrahedron but also the color material values of relatively dark color materials at grid points within the tetrahedron are controlled, thereby obtaining a preferred print image for which the graininess is suppressed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264119, filed Dec. 1, 2011, which is hereby incorporated by reference herein in its entirety.

What is claimed is:

1. A color processing apparatus for generating a color separation table for an image forming apparatus which has a relatively dark color material with a high relative density and a relatively light color material with a low relative density, the color processing apparatus comprising:
    a setting section configured to set a gamut boundary for limiting use of the relatively dark color material;
    a determiner configured to select one of a plurality of relatively dark color materials, and determine, from a basic color separation table, at least a grid point which satisfies a condition that a color material value of the selected relatively dark color material is nonzero and a color value to be reproduced based on color material values set to the grid point exists in a region brighter than the gamut boundary; and
    a replacement section configured to replace, by a color material value of the relatively light color material, the color material value of the selected relatively dark color material set to the grid point which satisfies the condition.

2. The apparatus according to claim 1, wherein the setting section sets a plane formed by a plurality of application start points as the gamut boundary, wherein an application start point in each hue is a point of starting to apply the relatively dark color material and has been set on a line segment connecting vertex grid points of the basic color separation table.

3. The apparatus according to claim 1, wherein the replacement section replaces the color material value of the relatively dark color material by the color material value of the relatively light color material with the same hue as that of the relatively dark color material.

4. The apparatus according to claim 1, wherein the replacement section replaces the color material value of the relatively dark color material by color material values of a plurality of relatively light color materials.

5. The apparatus according to claim 1, wherein the relatively dark color material comprises a cyan color material for a light cyan color material, and a magenta color material for a light magenta color material.

6. The apparatus according to claim 1, wherein the relatively dark color material comprises a black color material for a cyan color material, a magenta color material, and a yellow color material.

7. The apparatus according to claim 1, wherein the setting section sets the gamut boundary for each hue.

8. A method of generating a color separation table for an image forming apparatus which has a relatively dark color material with a high relative density and a relatively light color material with a low relative density, the method comprising:
    using a processor to perform the steps of:
    setting a gamut boundary for limiting use of the relatively dark color material;

selecting one of a plurality of relatively dark color materials;

determining, from a basic color separation table, at least a grid point which satisfies a condition that a color material value of the selected relatively dark color material is nonzero and a color value to be reproduced based on color material values set to the grid point exists in a region brighter than the gamut boundary; and replacing, by a color material value of the relatively light color material, the color material value of the selected relatively dark color material set to the grid point which satisfies the condition.

9. A non-transitory computer-readable medium storing a computer-executable program for causing a computer to perform a method of generating a color separation table for an image forming apparatus which has a relatively dark color material with a high relative density and a relatively light color material with a low relative density, the method comprising:

setting a gamut boundary for limiting use of the relatively dark color material;

selecting one of a plurality of relatively dark color materials;

determining, from a basic color separation table, at least a grid point which satisfies a condition that a color material value of the selected relatively dark color material is nonzero and a color value to be reproduced based on color material values set to the grid point exists in a region brighter than the gamut boundary; and replacing, by a color material value of the relatively light color material, the color material value of the selected relatively dark color material set to the grid point which satisfies the condition.

* * * * *